United States Patent
Cheung et al.

(10) Patent No.: US 11,100,330 B1
(45) Date of Patent: Aug. 24, 2021

(54) PRESENTING MESSAGES TO A USER WHEN A CLIENT DEVICE DETERMINES THE USER IS WITHIN A FIELD OF VIEW OF AN IMAGE CAPTURE DEVICE OF THE CLIENT DEVICE

(71) Applicant: Facebook, Inc., Menlo Park, CA (US)

(72) Inventors: Vincent Charles Cheung, San Carlos, CA (US); Connie Yeewei Ho, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 243 days.

(21) Appl. No.: 16/235,231

(22) Filed: Dec. 28, 2018

Related U.S. Application Data

(63) Continuation-in-part of application No. 15/791,325, filed on Oct. 23, 2017, now abandoned.

(51) Int. Cl.
*G06F 21/32* (2013.01)
*G06K 9/00* (2006.01)
*H04N 21/44* (2011.01)

(52) U.S. Cl.
CPC ......... *G06K 9/00744* (2013.01); *G06F 21/32* (2013.01); *G06K 9/00228* (2013.01); *G06K 9/00288* (2013.01); *H04N 21/44008* (2013.01)

(58) Field of Classification Search
CPC ........... G06K 9/00744; G06K 9/00228; G06K 9/00288; G06F 21/32
See application file for complete search history.

(56) References Cited

U.S. PATENT DOCUMENTS

| | | | | |
|---|---|---|---|---|
| 9,390,316 B2 * | 7/2016 | Okamura | ........... | G06K 9/00281 |
| 2003/0113002 A1 * | 6/2003 | Philomin | ........... | G06K 9/00885 |
| | | | | 382/116 |
| 2004/0119851 A1 * | 6/2004 | Kaku | ................. | G06K 9/00899 |
| | | | | 348/239 |
| 2004/0153645 A1 * | 8/2004 | Smith | ..................... | H04L 63/08 |
| | | | | 713/168 |
| 2005/0004990 A1 * | 1/2005 | Durazo | ................ | G06Q 10/107 |
| | | | | 709/206 |
| 2007/0183634 A1 * | 8/2007 | Dussich | ............. | G06K 9/00295 |
| | | | | 382/118 |
| 2008/0088698 A1 * | 4/2008 | Patel | ........................ | H04N 7/15 |
| | | | | 348/14.09 |

(Continued)

*Primary Examiner* — Vance M Little
(74) *Attorney, Agent, or Firm* — Fenwick & West LLP

(57) ABSTRACT

Various client devices include displays and one or more image capture devices configured to capture video data. Different users of an online system are associated with client devices that exchange information captured by their respective image capture devices. A user of a client device may provide a message to an additional user of an additional client device for asynchronous presentation to the additional user. The message includes information identifying the additional user and one or more privacy settings. When the additional client device identifies the user via captured video data, the online system determines whether the message has previously been presented to the additional user. Subject to the privacy settings included in the message, the additional client device presents the message to the additional user after detecting the additional user and determining the message has not previously been presented to the additional user.

18 Claims, 3 Drawing Sheets

(56) References Cited

U.S. PATENT DOCUMENTS

| | | | | |
|---|---|---|---|---|
| 2010/0050090 A1* | 2/2010 | Leebow | ............... | G06F 3/048 |
| | | | | 715/751 |
| 2010/0205667 A1* | 8/2010 | Anderson | ............ | G06F 3/017 |
| | | | | 726/19 |
| 2013/0326220 A1* | 12/2013 | Connelly | ........... | H04L 9/3226 |
| | | | | 713/168 |
| 2015/0332088 A1* | 11/2015 | Chembula | ........... | G06K 9/468 |
| | | | | 382/203 |

* cited by examiner

PRESENTING MESSAGES TO A USER WHEN A CLIENT DEVICE DETERMINES THE USER IS WITHIN A FIELD OF VIEW OF AN IMAGE CAPTURE DEVICE OF THE CLIENT DEVICE

CROSS REFERENCE TO RELATED APPLICATIONS

This application is a continuation-in-part of co-pending U.S. application Ser. No. 15/791,325, filed Oct. 23, 2017, which is incorporated by reference in its entirety.

BACKGROUND

This disclosure relates generally to presenting content to a user, and more specifically to presenting content to a user via a client device when images captured by the client device are determined to include the user.

Increasingly, client devices, online systems, and networks allow users to exchange larger amounts of content with each other. For example, an online system allows its users to exchange video contents via client devices associated with the user. In a specific example, an online system may establish video messaging between a user and an additional user, allowing the users to exchange video data captured by their respective client devices in real-time or in near real-time.

In addition to allowing for real-time or near-real time communication, an online system allows its users to asynchronously communicate via client devices. For example, a user provides a message to a client device associated with an additional user, and the client device subsequently presents the message when the additional user interacts with the client device associated with the additional user. However, conventional client devices require a user to interact with a client device before a message for the user is presented by the client device. For example, a client device does not present a message to the user until the user provides one or more inputs to the client device identifying the message or requesting presentation of the message. Limiting presentation of messages to a user until the user has interacted with a client device may delay the user receiving the message or increase a likelihood of the user not being presented with the message because the user does not directly interact with the client device.

SUMMARY

Various client devices associated with users of an online system include one or more image capture devices. An image capture device included in a client device is configured to capture video data of a local area surrounding the client device, based on a user's setting and authorization. This allows users associated with different client devices to exchange video contents with each other. In various embodiments, a client device receives a message for presentation to a target user of an online system who is associated with the client device. The message may be video data, image data, audio data, text data, or any combination thereof received from an online system or received from another client device for presentation to the target user. The client device, upon determining that the target user is in the field of view of the image capture device included in the client device, automatically presents the message to the target user.

The message may include one or more privacy settings regulating presentation of the content of the message. For example, a privacy setting limits presentation of the message to the target user, which prevents the client device from presenting the message if the client device identifies at least one other user within the field of view of the imaging device of the client device. As another example, a privacy setting identifies one or more authorized users, allowing the client device to subsequently present the message to the target user if the one or more authorized users are within the field of view of the imaging device of the client device and there is not at least one user other than the target user or the one or more authorized users within the field of view of the imaging device of the client device. Hence, if one or more privacy settings specify authorized users, the client device does not subsequently present the message to the target user if the client device identifies at least one user other than the target user who is not an authorized user within the field of view of the imaging device of the client device. In various embodiments, a user providing the message to the client device specifies one or more of the privacy settings included in the message. Alternatively or additionally, the target user maintains one or more privacy settings that are retrieved and included in messages identifying the target user. For example, the target user includes one or more privacy settings in a user profile maintained by the online system; the online system receives the message for the target user or receives information identifying the message for the target user, retrieves the one or more privacy settings included in the user profile of the target user, and includes the retrieved one or more privacy settings in the message.

Based on user's authorization specified in one of the privacy settings maintained by the client device or the online system, the image capture device of the client device captures video data or image data of a local area surrounding the client device. In various embodiments, the client device applies one or more machine learned models to characteristics of the video captured by the image capture device to locate people included in the captured video data. The client device may use any suitable model or combination of models to locate people within video data captured by the image capture device. In one case, the user's authorization allows the client device to perform facial detection and tracking. Models applied by the client device to captured video data may perform facial tracking (in two-dimensions or in three-dimensions), two-dimensional pose tracking, three-dimensional pose tracking, or any other suitable method to identify portions of a person's face or portions of the person's body.

In some embodiments, the client device determines whether the target user is included in the captured video data. For example, based on users' authorization, the client device locally stores information identifying the target user and compares people identified in the captured video data to the information identifying the target user. As an example, the client device stores images of the target user's face and compares faces of people located within the captured video data to the images of the target user's face. The client device may use one or more facial recognition processes to determines measures of similarity between stored images of the target user's face and faces of people located within the captured video data; if a face of a person located within the captured video data has at least a threshold measure of similarity to the images of the target user's face, the client device determines the target user is included in the captured video data.

The client device may use suitable authorized information to identify the target user to determine whether the captured video data includes the target user. For example, when the target user authorizes the client device to store images of the target user's face, the client device compares faces of people located in in the captured video data to stored images of the target user's face using any suitable facial recognition method and determines the captured video data includes the target user in response to a face of a person located in the captured video data having at least a threshold measure of similarity to a stored image of the target user's face. As another example, based on user's authorization, the client device captures audio data from a person in the local area of the client device, and the captured audio data is compared to stored audio data identifying the target user (e.g., a recording of the target user's voice) by the client device. The client device determines the target user is included in the captured video data in response to the captured audio data having at least a threshold measure of similarity to the stored audio data identifying the target user. In another example, the client device extracts a color map from previously captured video data including the target user and associates the extracted color map with the target user; subsequently, the client device extracts an additional color map from the captured video data. If the client device determines the additional color map has at least a threshold measure of similarity with the color map associated with the target user, the client device determines the captured video data includes the target user. In various embodiments, the previously captured video data from which the color map is extracted may be video data captured within a threshold time interval of a time when the client device received the message (e.g., within 2 hours of when the client device received the message).

If the client device determines the captured video data includes the target user, the client device obtains information identifying content previously presented to the target user. Content may be previously presented to the target user through the client device or through other ways such as using other interfaces (e.g., online website, mobile messengers) of an online system that transmits the message. In some embodiments, the obtained information identifying content previously presented is a flag or a field associated with the message indicating whether the message has been presented to the target user. For example, the client device stores a value in association with the message that has a value if the message (or at least a threshold amount of the message) has been presented to the target user and that has an alternative value if the message (or at least the threshold amount of the message) has not been presented to the target user. Alternatively, the client device or the online system maintains identifiers of content, such as messages, previously presented to the target user in association with the target user and times when different content was presented to the target user. For example, the online system maintains identifiers of content items, including messages, presented to the target user and times when the content items were presented to the target user in association with the target user.

From the obtained information, the client device or the online system determines whether the message was previously presented to the target user. In response to determining the message was not previously presented to the target user, the client device presents the message to the target user. If the message includes one or more privacy settings, the client device presents the message to the target user subject to the one or more privacy settings. For example, the message includes a privacy setting specifying the message is not presented if the client device or the online system determines at least one user other than the target user is within the field of view of the image capture device of the client device. Hence, the client device withholds presentation of the message to the target user in response to determining the captured video data includes at least one user other than the target user; any suitable method for identifying users included in the captured video data, as described above, may be used to determine whether the captured video data includes at least one user other than the target user. As another example, the message includes one or more privacy settings identifying one or more authorized users who may be included in the captured video data along with the target user. In the preceding example, the client device or the online system determines whether the captured video data includes at least one user other than the target user or an authorized user specified by the one or more privacy settings using any suitable method to identify users, such as those further described above in conjunction with determining whether the captured video data includes the target user. In response to determining the captured video data includes at least one user other than the target user who is not an authorized user, the client device withholds presentation of the message to the target user; alternatively, in response to determining the captured video data does not include a user other than the target user or an authorized user, the client device presents the message to the target user. Hence, if one or more privacy settings identify authorized users, the client device presents the message to the target user if the captured video data includes the target user as well as one or more authorized users but does not include at least one user who is not the target user or an authorized user.

After presenting the message to the target user, the client device stores an indication the message was presented to the target user in association with the message. For example, the client device changes a value associated with the message after presenting the message to the target user and stores the changed value in association with the message. The client device transmits the indication to the online system in association with information identifying the target user, and the online system stores the indication in association with the message or in association with information identifying the target user. For example, the online system stores a value indicating the message has been presented to the target user in association with an identifier of the message. The indication the message has been presented to the target user is associated with the message and with the target user (e.g., with a user profile of the target user) by the online system in various embodiments.

Hence, the client device presents the message to the target user without receiving an interaction from the target user by determining whether video data (or images) captured by the image capture device includes the target user. This allows the client device to more easily present the message to the target user, increasing a likelihood of the target user being presented with the message. Additionally, determining whether the message has previously been presented to the target user before presenting the message to the target user allows the client device to present the target user with a message when it is new to the user, allowing the client device to more easily present messages to the target user that have not previously been presented to the target user. This increases a likelihood of the target user being presented with messages by the client device, which may increase a likelihood of the target user responding to the messages by providing content to the user from whom the message was received.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
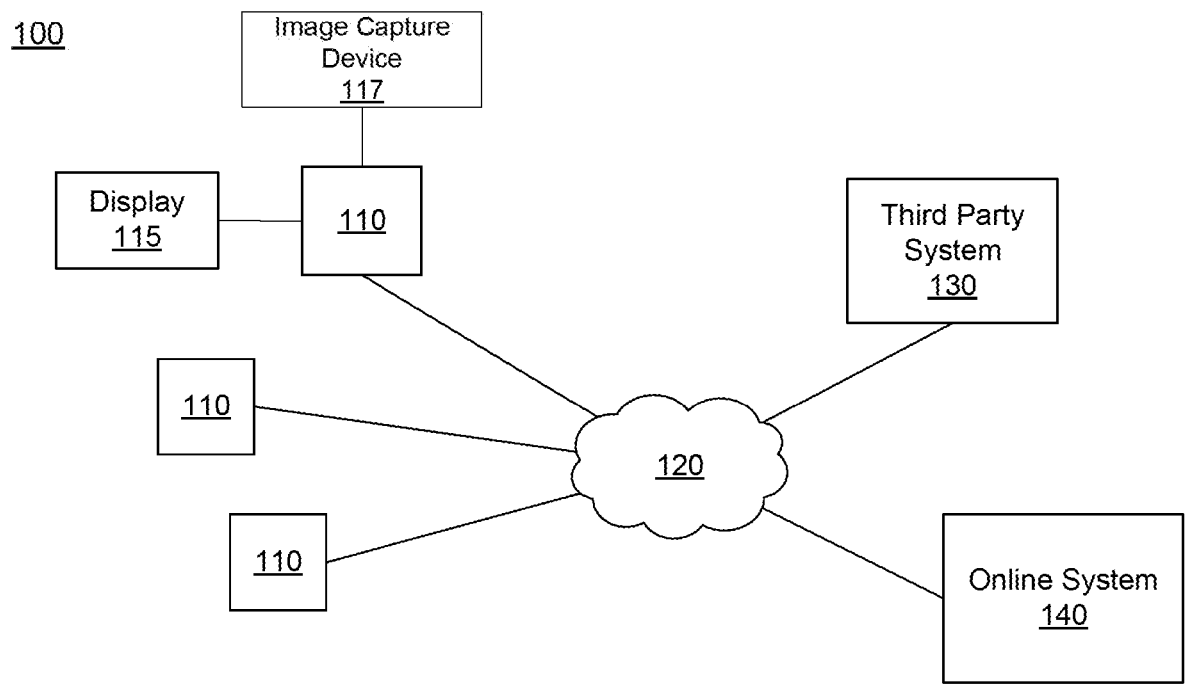
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. Additionally, in the system environment 100 shown by FIG. 1, a controller 117 is coupled to a client device 110. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. As further described below in conjunction with FIG. 2, a client device 110 includes a display device 115 configured to present content, and one or more image capture devices configured to capture image or video data of a local area surrounding the client device 110.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 3. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
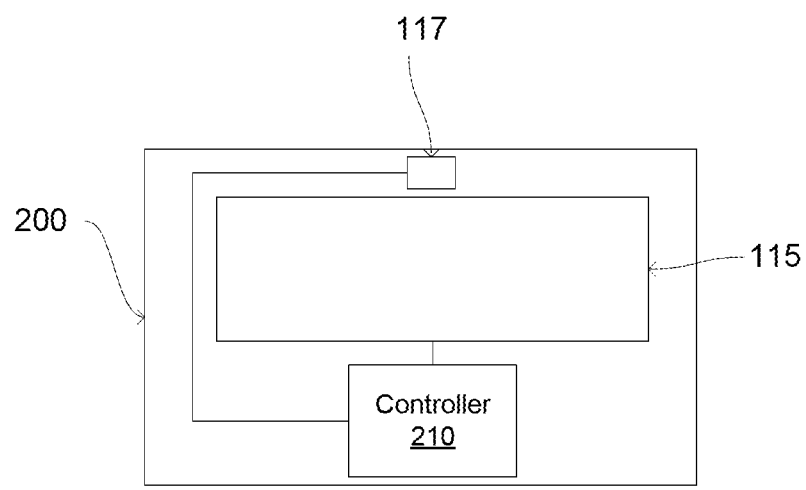
FIG. 2 is a block diagram of a client device, in accordance with an embodiment.

FIG. 2 is a block diagram of an embodiment of a client device 117. In the embodiment shown in FIG. 2, the client device 110 includes a display device 115 and an image capture device 117, as well as a controller 210. However, in other embodiments, the client device 110 includes different or additional components than those shown in FIG. 2.

The display device 115 may be integrated into the client device 110 or coupled to the client device 110. For example, a display device 115 integrated into a client device 110 is a display screen included in the client device 110. Alternatively, the display device 115 is a monitor or other display coupled to the client device 110. The display device 115 presents image data or video data to a user. Image or video data presented by the display device 115 is determined by an application executing on the client device 110. Different applications may be included on the client device 110, so execution of different applications changes the content presented by the user by the display device 115.

The image capture device 117 captures video data or images of a local area surrounding the client device 110 and within a field of view of the image capture device 117. In some embodiments, the image capture device 117 includes one or more cameras, one or more video cameras, or any other device capable of capturing image data or video data. Additionally, the image capture device 117 may include one or more filters (e.g., used to increase signal to noise ratio). Various parameters (e.g., focal length, focus, frame rate, ISO, sensor temperature, shutter speed, aperture, focal point etc.) configure capture of video data or image data by the image capture device 117. Hence, modifying one or more parameters of the image capture device 117 modifies video data or image data captured by the image capture device 117 after modification of the one or more parameters. While FIG. 2 shows a single image capture device 117 included in the client device 110, in other embodiments, the client device 110 includes any suitable number of image capture devices 117.

The controller 210 is coupled to the image capture device 117 and comprises a storage device coupled to a processor. In various embodiments, the controller 210 is also coupled to the display device 115. Based on users' authorization, the controller 210 includes instructions that, when executed by the processor, apply one or more models to video data captured by the image capture device 117. For example, models applied to captured video data by the controller 210 apply one or more rules to characteristics of captured video data to identify objects, people, movement, or any other suitable content of the captured video data. In various embodiments, users may authorize the controller 210 to apply models that locate people in captured video data based on characteristics of the captured video data. As further described below in conjunction with FIG. 4, the controller 210 may determine whether video data captured by the image capture device 117 includes a target user based on the located people in the captured video data. In various embodiments, in response to determining the captured video data includes the target user, the controller 210 retrieves a message identifying the target user and including content for presentation to the target user and presents the message to the target user if the message has not previously been presented to the target user, as further described below in conjunction with FIG. 4.

The online system 140 and the client device 110 may cooperatively and/or individually maintain and enforce one or more privacy settings for users or for people identified from captured video data or other data in various embodiments. A privacy setting of a user or person determines how particular information associated with a user or person can be shared, and may be stored in association with information identifying the user or the person. In some embodiments, the controller 210 retrieves privacy settings for one or more users maintained by the online system 140. In one embodiment, a privacy setting specifies particular information associated with a user and identifies other entities with whom the specified information may be shared.

For example, in particular embodiments, privacy settings may allow a first user to specify (e.g., by opting out, by not opting in) whether the online system 140 may receive, collect, log, or store particular objects or information associated with the user for any purpose. In particular embodiments, privacy settings may allow the first user to specify whether particular video capture devices, audio capture devices, applications or processes may access, store, or use particular objects or information associated with the user. The privacy settings may allow the first user to opt in or opt out of having objects or information accessed, stored, or used by specific devices, applications or processes. The online system 140 may access such information in order to provide a particular function or service to the first user, without the online system 140 having access to that information for any other purposes. Before accessing, storing, or using such objects or information, the online system may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the online system 140.

The privacy settings maintained and enforced by the online system 140 and/or the controller 210 may be associated with default settings. In various embodiments, the controller 210 does not identify a user within captured video data, audio data, image data, or other data unless the controller 210 obtains a privacy setting from the user authorizing the controller 210 to identify the user. For example, a privacy setting associated with a user has a default setting preventing the controller 210 from identifying the user, so the controller 210 does not identify the user unless the user manually alters the privacy setting to allow the controller 210 to identify the user. Additionally, a privacy setting regulates transmission of information captured by the client device 110 to another entity (e.g., another client device 110, the online system 140, a third party system 130) in various embodiments. The privacy setting has a default setting preventing transmission of information, preventing the controller 210 from transmitting information identifying the user to other entities unless the user manually modifies the privacy setting to authorize transmission. Furthermore, the controller 210 maintains the one or more privacy settings for each user identified from captured video data or other data, allowing user-specific control of transmission and identification of each user. In some embodiments, the controller 210 prompts a person to provide privacy settings when the controller 210 initially identifies the person from captured data and stores the provided privacy settings in association with information identifying the person.

In various embodiments, for the online system 140 and/or various components client device 110 that have functionalities that may use, as inputs, personal or biometric information of a user for user-authentication or experience-personalization purposes, a user may opt to make use of these functionalities to enhance their experience using the device and the online system. As an example and not by way of limitation, a user may voluntarily provide personal or biometric information to the online system 140. The user's privacy settings may specify that such information may be used only for particular processes, such as authentication, and further specify that such information may not be shared with any third-party or used for other processes or applications associated with the online system 140. As another example and not by way of limitation, the online system 140 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system or used by other processes or applications associated with the online system 140. As another example and not by way of limitation, the online system 140 may provide a functionality for a user to provide a reference image (e.g., a facial profile) to the online social network. The online social network may compare the reference image against a later-received image input (e.g., to authenticate the user, to tag the user in photos). The user's privacy setting may specify that such personal or biometric information may be used only for a limited purpose (e.g., authentication, tagging the user in photos), and further specify that such voice recording may not be shared with any third-party system or used by other processes or applications associated with the system 140. Any of such restrictions on capture biometric and/or other personal data may also be applied to the client device 110.

Users may authorize the capture of data, identification of users, and/or sharing and cross-application use of user-related data in one or more ways. For example, the client devices 110 may limit the storage of data captured by the client devices to local storage only unless users authorize the client device 110 to upload the data to the online system 140.

Users may pre-select various privacy settings before the users use the features of the client devices 110 and/or take actions in the online system 140. In another case, a selection dialogue may be prompted when users first carry out an action or use a feature of the client devices 110 and/or the online system 140 and/or when users have not carried out the action or used the feature for a predetermined period of time. In yet another example, the client devices 110 and the online system 140 may also provide notifications to the users when certain features that require user data begin to operate or are disabled due to users' selections to allow users to make further selections through the notifications. Other suitable ways for users to make authorizations are also possible.

Figure 3:
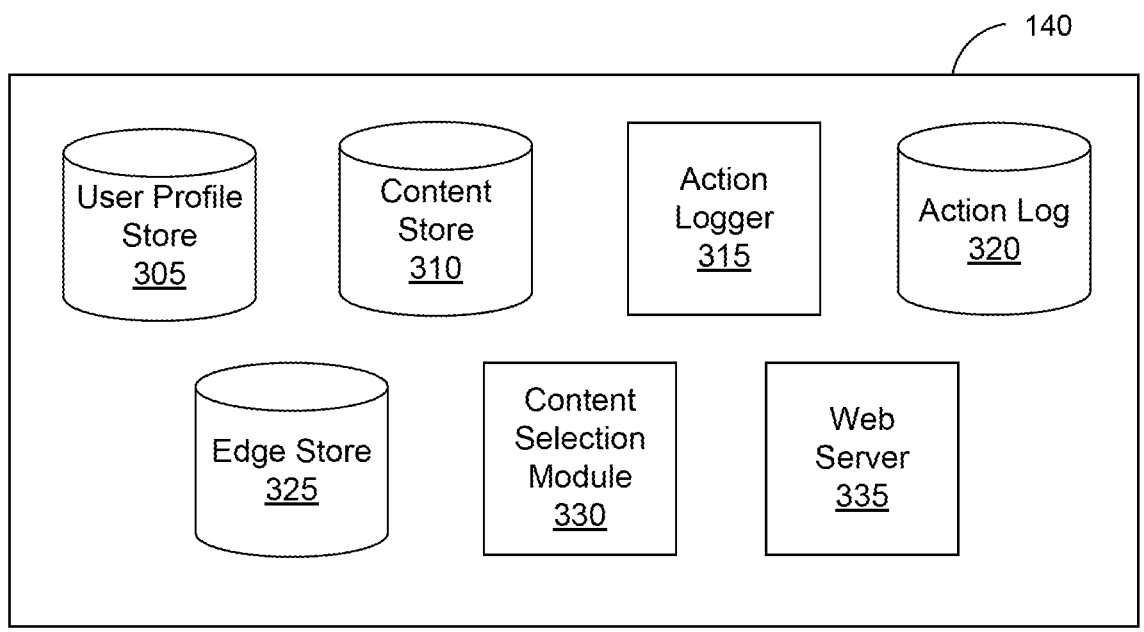
FIG. 3 is a block diagram of an online system, in accordance with an embodiment.

FIG. 3 is a block diagram of an architecture of the online system 140. The online system 140 shown in FIG. 3 includes a user profile store 305, a content store 310, an action logger 315, an action log 320, an edge store 325, a content selection module 330, and a web server 335. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 305. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 305 may also maintain references to actions by the corresponding user performed on content items in the content store 310 and stored in the action log 320.

Additionally, a user profile maintained for a user includes characteristics of one or more client devices 110 associated with the user, allowing the online system 140 to subsequently identify the user from characteristics provided by a client device 110. For example, an application associated with the online system 140 and executing on a client device 110 provides a device identifier or other information uniquely identifying the client device 110 to the online system 140 in association with a user identifier. The online system 140 stores the device identifier or other information uniquely identifying the client device 110 in the user profile maintained for the user, allowing subsequent identification of the user if the online system 140 receives the device identifier or other information uniquely identifying the client device 110. Other characteristics of client devices 110 associated with the user may be alternatively or additionally included in the user profile maintained by the user. For example, the user profile includes a network address used by a client device 110 to access a network 120, an identifier of an application executing on a client device 110 from which the online system 140 received information, a type of the client device 110 (e.g., a manufacturer, an identifier of a model of the client device 110, etc.) from which the online system 140 received information, and an operating system executing on the client device 110 from which the online system 140 received information. However, the online system 140 may store any suitable characteristics of a client device 110 in a user profile, allowing the online system 140 to maintain information about client devices 110 used by the user corresponding to the user profile.

Additionally, a user profile associated with a user may include one or more privacy settings for a user that regulate presentation of content to the user. For example, a privacy setting specifies that a client device 110 does not present content identifying a user if image or video data captured by an image capture device 117 of a client device 110 include at least one user of the online system 140 (or at least one person) other than the user. As another example, one or more privacy settings identify authorized users of the online system 140, so a client device 110 presents content identifying the user if an image capture device 117 of the client device 110 includes the target user and one or more of the authorized users but does not include a user or person who is not the target user or is an authorized user. This allows the user to limit presentation of certain content to the user when other users may be capable of also viewing the content during presentation to the user.

While user profiles in the user profile store 305 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 310 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 310, such as status updates, photos tagged by users to be associated with other objects in the online system 140, events, groups or applications. In some embodiments, objects are received from third-party applications or third-party applications separate from the online system 140. In one embodiment, objects in the content store 310 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 310 include a creative, which is content for presentation to a user, and a bid amount. The creative is text, image, audio, video, or any other suitable data presented to a user. In various embodiments, the creative also specifies a page of content. For example, a content item includes a link that specifying a network address of a landing page of content to which a user is directed when the content item is accessed. If a user presented with the content The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

The content store 310 may include one or more messages for presentation to a user. A message includes one or more of: text data, video data, audio date, image data, and any combination thereof. Additionally, the message includes information identifying the user to whom the content is to be presented, such as an identifier used by the online system 140 to identify the user. The message may be received from an additional user, so the content store 210 also includes information identifying the additional user. Additionally, the message may include one or more privacy settings that regulate presentation of the message to the user, as further described above. In various embodiments, the additional user specifies one or more privacy settings included in the message when providing the message to the online system 140. Alternatively or additionally, one or more of the privacy settings are determined from the user profile of the user, with the one or more privacy settings retrieved from the user profile of the user, which is identified from the information identifying the user included in the message.

Based on users' privacy settings, the action logger 315 may be authorized to receive communications about user actions internal to and/or external to the online system 140, populating the action log 320 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 320.

Based on the privacy settings, the action log 320 may be authorized by the users to be used by the online system 140 to track user actions on the online system 140, as well as actions on third party systems 130 that communicate information to the online system 140. Users may interact with various objects on the online system 140, and information describing these interactions is stored in the action log 320. Examples of interactions with objects include: commenting on posts, sharing links, checking-in to physical locations via a client device 110, accessing content items, and any other suitable interactions. Additional examples of interactions with objects on the online system 140 that are included in the action log 320 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 320 may record a user's interactions with advertisements on the online system 140 as well as with other applications operating on the online system 140. In some embodiments, data from the action log 320 is used to infer interests or preferences of a user, augmenting the interests included in the user's user profile and allowing a more complete understanding of user preferences.

The action log 320 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 320 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 315 by the application for recordation and association with the user in the action log 320.

In one embodiment, the edge store 325 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

The content selection module 330 selects one or more content items for communication to a client device 110 to be presented to a user. Content items eligible for presentation to the user are retrieved from the content store 310 or from another source by the content selection module 330, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 330 includes content items eligible for presentation to the user in one or more selection processes, which identify a set of content items for presentation to the user. For example, the content selection module 330 determines measures of relevance of various content items to the user based on attributes associated with the user by the online system 140 and based on the user's affinity for different content items. A measure of relevance of a content item to the user is based on a measure of quality of the content item for the user, which may be based on the creative included in the content item as well as content of a landing page identified by a link in the content item. Based on the measures of relevance, the content selection module 330 selects content items for presentation to the user. As an additional example, the content selection module 330 selects content items having the highest measures of relevance or having at least a threshold measure of relevance for presentation to the user. Alternatively, the content selection module 330 ranks content items based on their associated measures of relevance and selects content items having the highest positions in the ranking or having at least a threshold position in the ranking for presentation to the user.

Content items eligible for presentation to the user may include content items associated with bid amounts. The content selection module 330 uses the bid amounts associated with content items when selecting content for presentation to the user. In various embodiments, the content selection module 330 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 330 may rank content items based on their associated bid amounts and select content items having at least a threshold position in the ranking for presentation to the user. In some embodiments, the content selection module 330 ranks both content items not associated with bid amounts and content items associated with bid amounts in a unified ranking based on bid amounts and measures of relevance associated with content items. Based on the unified ranking, the content selection module 330 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 330 receives a request to present a feed of content to a user of the online system 140. The feed includes content items such as stories describing actions associated with other online system users connected to the user. The content selection module 330 accesses one or more of the user profile store 305, the content store 310, the action log 320, and the edge store 325 to retrieve information about the user. For example, information describing actions associated with other users connected to the user or other data associated with users connected to the user are retrieved. Content items from the content store 310 are retrieved and analyzed by the content selection module 330 to identify candidate content items eligible for presentation to the user. For example, content items associated with users who not connected to the user or stories associated with users for whom the user has less than a threshold affinity are discarded as candidate content items. Based on various criteria, the content selection module 330 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 330 presents content to a user through a feed including a plurality of content items selected for presentation to the user. The content selection module 330 may also determine the order in which selected content items are presented via the feed. For example, the content selection module 330 orders content items in the feed based on likelihoods of the user interacting with various content items.

The content selection module 330 receives video data captured by an image capture device 117 included in a client device 110 associated with a user of the online system 140 and determines whether to present a message identifying the user to the user via the client device 110. The content selection module 330 determines whether the captured video data includes the user by comparing users, or people, located in the captured video data to information identifying the user, as further described below in conjunction with FIG. 4. If the content selection module 330 determines the captured video data includes information matching information identifying the user identified by the message, the content selection module 330 determines whether the message has previously been presented to the user. For example, the content selection module 330 accesses the action log 320 and determines whether the action log 320 includes an identifier of the message and an indication the message has been presented to the user. As another example, the content selection module 320 accesses data associated with the message that has different values based on whether the message has been or has not been presented to the user. In response to determining the message has not previously been presented to the user, the content selection module 330 provides the message to the client device 110 from which the captured video data was received for presentation or provides an instruction to the client device 110 from which the captured video data was received to present the message to the user, as further described below in conjunction with FIG. 4.

The web server 335 links the online system 140 via the network 120 to the one or more client devices 110, as well as to the one or more third party systems 130. The web server 335 serves web pages, as well as other content, such as JAVA®, FLASH®, XML and so forth. The web server 335 may receive and route messages between the online system 140 and the client device 110, for example, instant messages, queued messages (e.g., email), text messages, short message service (SMS) messages, or messages sent using any other suitable messaging technique. A user may send a request to the web server 335 to upload information (e.g., images or videos) that are stored in the content store 310. Additionally, the web server 335 may provide application programming interface (API) functionality to send data directly to native client device operating systems, such as IOS®, ANDROID™, or BlackberryOS.

Asynchronous Presentation of a Message to a User of a Client Device

Figure 4:
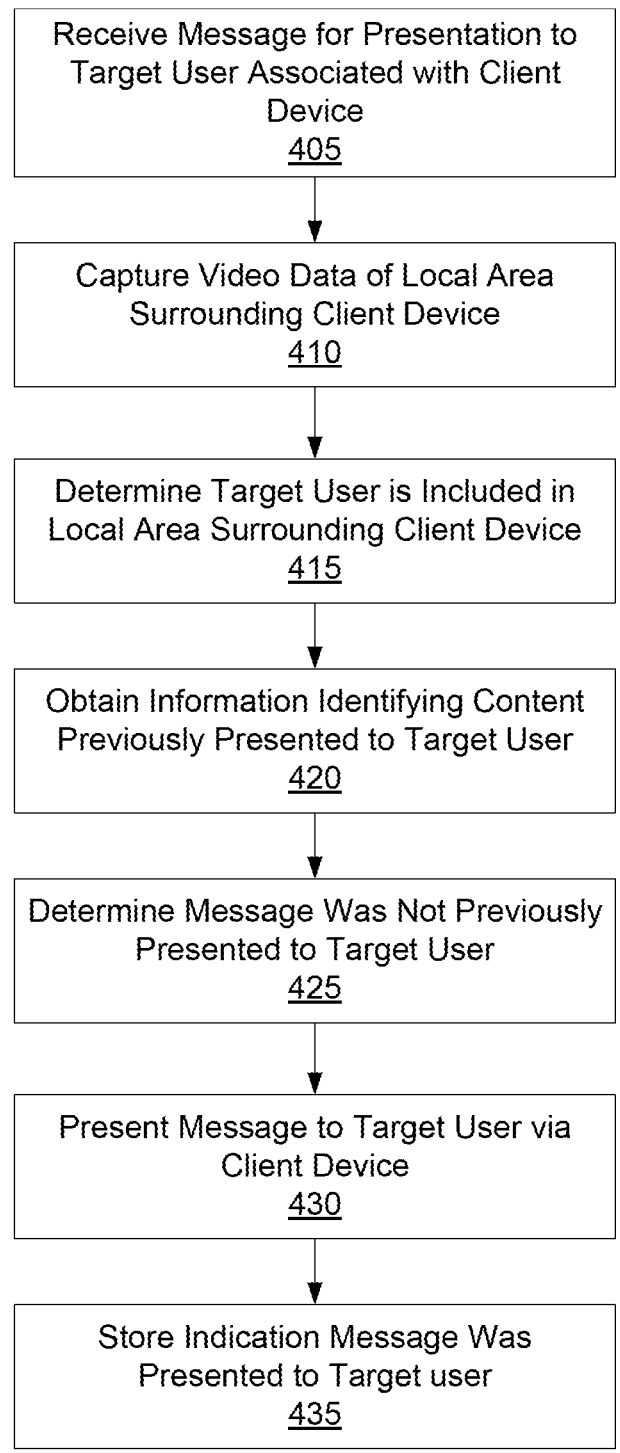
FIG. 4 is a flowchart of a method for presenting a message to a user of a client device when the client device identifies the user, in accordance with an embodiment.

FIG. 4 is a flowchart of one embodiment of a method for presenting a message to a user of a client device 110 when the client device 110 identifies the user. In various embodiments, the steps described in conjunction with FIG. 4 may be performed in different orders. Additionally, in some embodiments, the method may include different and/or additional steps than those shown in FIG. 4.

A client device 110 includes an image capture device 117, as further described above in conjunction with FIGS. 1 and 2. The client device 110 receives 405 a message for presentation to a target user of an online system 140 who is associated with the client device 110. In various embodiments, the message is video data, image data, audio data, text data, or any combination thereof received from an online system 140 for presentation to the target user. As another example, the message includes one or more of video data, text data, audio data, and image data received from another client device 110. In another example, another user interacts with the client device 110 to generate the message for the target user; for example, the other user is authorized to access the client device 110 and records video data for the target user via the image capture device 117 of the client device 110 or provides text data for presentation to the target user via an input device of the client device 110. As another example, the message identifies a target object and associates the target object with content and information identifying the target user. Hence, the message includes any suitable content and information identifying the target user (e.g., a username of the target user maintained by the online system 140).

In addition to the content and information identifying the target user, the message may include one or more privacy settings regulating presentation of the content of the message. For example, a privacy setting limits presentation of the message to the target user, which prevents the client device 110 from presenting the message if the client device 110 identifies at least one other user within the field of view of the imaging device 117 of the client device 110. As another example, a privacy setting identifies one or more authorized users, allowing the client device 110 to subsequently present the message to the target user if the one or more authorized users are within the field of view of the imaging device 117 of the client device 110 and there is not at least one user other than the target user or the one or more authorized users within the field of view of the imaging device 117 of the client device 110. Hence, if one or more privacy settings specify authorized users, the client device 110 does not subsequently present the message to the target user if the client device 110 identifies at least one user other than the target user who is not an authorized user within the field of view of the imaging device 117 of the client device 110. In various embodiments, a user providing the message to the client device 110 specifies one or more of the privacy settings included in the message. Alternatively or additionally, the target user maintains one or more privacy settings that are retrieved and included in messages identifying the target user. For example, the target user includes one or more privacy settings in a user profile maintained by the online system 140; the online system 140 receives the message for the target user or receives information identifying the message for the target user, retrieves the one or more privacy settings included in the user profile of the target user, and includes the retrieved one or more privacy settings in the message.

In some embodiments, the client device 110 stores the message in a storage device, allowing the client device 110. Alternatively, the client device 110 stores information identifying the message, such as a notification for presentation to the target user and an identifier for retrieving the message from the online system 140 or from another source. In some embodiments, the client device 110 stores a portion of the message in a local storage device, while the message is maintained by the online system 140.

Based on the user's setting and authorization, the image capture device 117 of the client device 110 captures 410 video data or image data of a local area surrounding the client device 110. Images captured by the image capture device 117 are communicated to a controller 210 included in the client device 110 (or coupled to the client device 110 in other embodiments). In various embodiments, based on user's authorization specified in one of the privacy settings maintained by the client device 110 or the online system 140, the controller 210 applies one or more machine learned models to characteristics of the video captured 410 by the image capture device 117 to locate people included in the captured video data. In various embodiments, the controller 210 applies one or more methods to locate people within the captured video data. The controller 210 may use any suitable model or combination of models to locate people within video data captured 405 by the image capture device 117. Models applied by the controller 210 to captured video data may perform facial tracking (in two-dimensions or in three-dimensions), two-dimensional pose tracking, three-dimensional pose tracking, or any other suitable method to identify portions of a person's face or portions of the person's body.

The client device 110 determines 415 whether the target user is included in the captured video data. In some embodiments, based on users' authorization, the client device 110 locally stores information identifying the target user and compares people identified in the captured video data to the information identifying the target user. For example, the client device 110 stores images of the target user's face and compares faces of people located within the captured video data to the images of the target user's face. The client device 110 may use one or more facial recognition processes to determines measures of similarity between stored images of the target user's face and faces of people located within the captured video data; if a face of a person located within the captured video data has at least a threshold measure of similarity to the images of the target user's face, the client device 110 determines 415 the target user is included in the captured video data.

In other cases, users may authorize the exchange of data and resources between the client device 110 and the online system 140 to enhance the user's experience in the client device 110. For example, based on the user's authorization, the client device 110 transmits the captured video data to the online system 140, which includes information identifying the target user, as further described above. The online system 140 compares people identified in the captured video data to the information identifying the target user and determines measures of similarity between people located in the captured video data to the information identifying the target user using any suitable method. The online system 140 determines 415 the target user is included in the captured video data in response to a person located in the captured video data has at least a threshold measure of similarity to the information identifying the target user. If the online system 140 determines 415 whether the target user is included in the captured video data, the online system 140 transmits an indication of the determination (e.g., a control signal having a value if the target user is determined 415 to be included in the captured video data and having an alternative value if the target user is determined 415 not to be included in the captured video data). If the client device 110 or if the online system 140 determines 415 the target user is not included in the local area surrounding the client device 110, the message is not subsequently presented via the client device 110.

The client device 110 or the online system 140 may use suitable authorized information to identify the target user to determine 415 whether the captured video data includes the target user. For example, when the target user authorizes the client device to store images of the target user's face, the client device 110 or the online system 140 compare faces of people located in in the captured video data to stored images of the target user's face using any suitable facial recognition method and determines 415 the captured video data includes the target user in response to a face of a person located in the captured video data having at least a threshold measure of similarity to a stored image of the target user's face. As another example, the client device 110 captures audio data from a person in the local area of the client device 110, and the captured audio data is compared to stored audio data identifying the target user (e.g., a recording of the target user's voice) by the client device 110 or by the online system 140 using any suitable method. The client device 110 or the online system 140 determines 415 the target user is included in the captured video data in response to the captured audio data having at least a threshold measure of similarity to the stored audio data identifying the target user. In another example, the online system 140 or the client device 110 extracts a color map from previously captured video data including the target user and associates the extracted color map with the target user; subsequently, the online system 140 or the client device 110 extracts an additional color map from the captured video data. If the online system 140 or the client device 110 determines the additional color map has at least a threshold measure of similarity with the color map associated with the target user, the online system 140 or the client device 110 determines 415 the captured video data includes the target user. In various embodiments, the previously captured video data from which the color map is extracted may be video data captured within a threshold time interval of a time when the client device 110 received 405 the message (e.g., within 2 hours of when the client device 110 received 405 the message).

If the online system 140 or the client device 110 determines 415 the captured video data includes the target user, the client device 110 or the online system 140 obtains 420 information identifying content previously presented to the target user. Content may be previously presented to the target user through the client device or through other ways such as using other interfaces (e.g., online website, mobile messengers) of an online system that transmits the message. In some embodiments, the obtained information is a flag or a field associated with the message indicating whether the message has been presented to the target user. For example, the online system 140 or the client device 110 stores a value in association with the message that has a value if the message (or at least a threshold amount of the message) has been presented to the target user and that has an alternative value if the message (or at least the threshold amount of the message) has not been presented to the target user. Alternatively, the client device 110 or the online system 140 maintains identifiers of content, such as messages, previously presented to the target user in association with the target user and times when different content was presented to the target user. For example, the online system 140 maintains identifiers of content items, including messages, presented to the target user and times when the content items were presented to the target user in association with the target user.

From the obtained information, the client device 110 or the online system 140 determines 425 whether the message was previously presented to the target user. In response to determining 425 the message was previously presented to the target user, the message is not presented to the target user via the client device 110. However, in response to determining 425 the message was not previously presented to the target user, the client device 110 presents 430 the message to the target user. If the message includes one or more privacy settings, the client device 110 presents 430 the message to the target user subject to the one or more privacy settings. For example, the message includes a privacy setting specifying the message is not presented if the client device 110 or the online system 140 determines at least one user other than the target user is within the field of view of the image capture device 117 of the client device 110. Hence, the client device 110 withholds presentation of the message to the target user in response to determining the captured video data includes at least one user other than the target user; any suitable method for identifying users included in the captured video data, as described above, may be used to determine whether the captured video data includes at least one user other than the target user. As another example, the message includes one or more privacy settings identifying one or more authorized users who may be included in the captured video data along with the target user. In the preceding example, the client device 110 or the online system 140 determines whether the captured video data includes at least one user other than the target user or an authorized user specified by the one or more privacy settings using any suitable method to identify users, such as those further described above in conjunction with determining 415 whether the captured video data includes the target user. In response to determining the captured video data includes at least one user other than the target user who is not an authorized user, the client device 110 withholds presentation of the message to the target user; alternatively, in response to determining the captured video data does not include a user other than the target user or an authorized user, the client device 110 presents 430 the message to the target user. Hence, if one or more privacy settings identify authorized users, the client device 110 presents 430 the message to the target user if the captured video data includes the target user as well as one or more authorized users but does not include at least one user who is not the target user or an authorized user.

If the message includes a target object, the client device 110 also determines whether the captured video data includes the target object. For example, the client device 110 applies one or more models to video data captured by the image capture device 117. As further described above in conjunction with FIG. 2, models applied to captured video data by the controller 210 apply one or more rules to characteristics of captured video data to identify objects, people, movement (e.g., including one or more recognizable gestures or other actions), any other suitable content of the captured video data, or any suitable combination thereof. The client device 110 determines measures of similarity between objects, people, movement, etc. identified from the captured video data to the target object using any suitable process or processes. If the client device 110 determines an object identified from the captured video data has at least a threshold measure of similarity to the target object, the client device 110 determines the captured video data includes the target object and determines 425 whether the message was previously presented to the target user, as further described above. In response to determining 425 the message was not previously presented to the target user and that the captured video includes the target object, the client device 110 presents 430 the message to the target user. However, if the client device 110 determines that the captured video data does not include the target object (i.e., at least one object identified from the captured video data does not have at least the threshold measure of similarity to the target object), the client device 110 does not present the message to the user, even if the message has not previously been presented to the user. Hence, identifying a target object in association with the message allows presentation of the message to be contingent on the target object being included in captured video data. In some embodiments, if the client device 110 determines the captured video data includes the target object, the client device 110 also determines a distance between the user and the target object from the captured video data and presents 430 the message in response to the determined distance between the user and the target object being less than or equal to a threshold distance, which may be included in the message along with the target object; however, if the determined distance between the user and the target object exceeds the threshold distance, the client device 110 does not present the message to the user. In other embodiments, the message identifies an interaction with the target object, and the client device 110 applies one or more models to the captured video data to determine interactions performed by the user. If the client device 110 determines the captured video data includes the user performing an interaction with the target object matching the interaction identified in the message, the client device 110 presents 430 the message; however, the client device 110 does not present the message if the captured video data does not include the user performing an interaction with the target object matching the interaction identified in the message. The interaction monitored by the client device 110 may be set and authorized by the user. Alternatively, specific interactions are associated with different objects, and the client device 110 presents 430 the message in response to determining captured video data includes the user performing an interaction with the target object matching a specific interaction associated with the target object, but does not present the message if captured video data does not include the user performing an interaction with the target object matching a specific interaction associated with the target object.

After presenting 430 the message to the target user, the client device 110 stores 435 an indication the message was presented to the target user in association with the message. For example, the client device 110 changes a value associated with the message after presenting 430 the message to the target user and stores 435 the changed value in association with the message. The client device 110 transmits the indication to the online system 140 in association with information identifying the target user, and the online system 140 stores the indication in association with the message or in association with information identifying the target user. For example, the online system 140 stores a value indicating the message has been presented to the target user in association with an identifier of the message. The indication the message has been presented to the target user is associated with the message and with the target user (e.g., with a user profile of the target user) by the online system 140 in various embodiments. Hence, the client device 110 presents 430 the message to the target user without receiving an interaction from the target user by determining whether video data (or images) captured by the image capture device 117 includes the target user.

Messages may identify multiple target users, and if the client device 110 receives a message identifying multiple target users, the client device 110 may present the target user when the video data captured 410 by the image capture device 117 includes a threshold number of the target users included in the message. For example, the client device 110 does not present the message unless video data captured by the image capture device 117 includes at least two target users identified by the message, as further described above. Additionally, if the client device 110 receives 405 multiple messages or receives 405 information identifying multiple messages, the client device 110 ranks the messages and presents the messages to the target user in an order determined by the ranking. For example, the client device 110 ranks the messages chronologically. In some embodiments, the chronological ranking causes more recently received messages to be presented before less recently received messages, while in other embodiments, the chronological ranking causes less recently received messages to be presented before more recently received messages. The client device 110 may alternatively or additionally rank the messages based on target users identified in the captured video data. For example, the client device ranks messages based on numbers of target users included in each message who are determined 415 to be included in the captured video data and who have not previously been presented with the messages. In the preceding example, messages including larger numbers of target users who are determined 415 to be included in the captured video data and who have not been presented with the messages have higher positions in the ranking. However, the client device 110 may use any suitable criteria for determining an order in which various messages are presented.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, at a client device including an image capture device, a message including content for presentation to a target user of an online system associated with the client device, the message including one or more privacy settings regulating presentation of the content included in the message based on authorized users being within a local area within a field of view of an image capture device of the client device;
   capturing video data of the local area within the field of view of the image capture device included in the client device;
   determining a user of the online system included in the captured video data is the target user;
   in response to determining the user of the online system included in the captured video data is the target user, obtaining information identifying content previously presented to the target user;
   determining the message was not previously presented to the target user from the obtained information; and
   presenting the message to the target user via the client device responsive to determining the message was not previously presented to the target user and to determining the target user is an authorized user identified by the one or more privacy settings included in the message and there are no users other than authorized users identified by the one or more privacy settings included in the message within the field of view of the image capture device.

2. The method of claim 1, wherein determining the user of the online system included in the captured video data is the target user comprises:
   transmitting the captured video data to the online system; and
   receiving information identifying the target user within the captured video data from the online system.

3. The method of claim 1, wherein one or more authorized users identified by the one or more privacy settings are users other than the target user.

4. The method of claim 3, wherein presenting the message to the target user via the client device responsive to determining the message was not previously presented to the target user comprises:
   withholding presentation of the message to the target user via the client device in response to determining the captured video data includes at least one user other than the target user or an authorized user identified by the one or more privacy settings included in the message.

5. The method of claim 1, wherein a privacy setting included in the message prevents presentation of the message to users other than the target user.

6. The method of claim 5, wherein presenting the message to the target user via the client device responsive to determining the message was not previously presented to the target user comprises:
   withholding presentation of the message to the target user via the client device in response to determining the captured video data includes at least one user who is not an authorized user.

7. The method of claim 1, further comprising:
   storing an indication the message was presented to the target user is association with the message responsive to presenting the message to the target user via the client device.

8. The method of claim 7, further comprising:
   transmitting the indication in association with information identifying the target user to the online system for storage in association with the message and with the target user.

9. The method of claim 1, wherein determining the user of the online system included in the captured video data is the target user comprises:
   determining a measure of similarity of information from the captured video data corresponding to the user to information identifying the target user; and
   determining the user of the online system included in the captured video data is the target user in response to the measure of similarity equaling or exceeding a threshold value.

10. A computer program product comprising a computer readable storage medium having instructions encoded thereon that, when executed by a processor, cause the processor to:
  receive, at a client device including an image capture device, a message including content for presentation to a target user of an online system associated with the client device, the message including one or more privacy settings regulating presentation of the content included in the message based on authorized users being within a local area within a field of view of an image capture device of the client device;
  capture video data of the local area within the field of view of the image capture device included in the client device;
  determine a user of the online system included in the captured video data is the target user;
  responsive to determining the user of the online system included in the captured video data is the target user, obtain information identifying content previously presented to the target user;
  determine the message was not previously presented to the target user from the obtained information; and
  present the message to the target user via the client device responsive to determining the message was not previously presented to the target user and to determining the target user is an authorized user identified by the one or more privacy settings included in the message and there are no users other than authorized users identified by the one or more privacy settings included in the message within the field of view of the image capture device.

11. The computer program product of claim 10, wherein determine the user of the online system included in the captured video data is the target user comprises:
  transmit the captured video data to the online system; and
  receive information identifying the target user within the captured video data from the online system.

12. The computer program product of claim 10, wherein one or more authorized users identified by the one or more privacy settings are users other than the target user.

13. The computer program product of claim 12, wherein present the message to the target user via the client device responsive to determining the message was not previously presented to the target user comprises:
  withhold presentation of the message to the target user via the client device in response to determining the captured video data includes at least one user other than the target user or an authorized user identified by the one or more privacy settings included in the message.

14. The computer program product of claim 10, wherein a privacy setting included in the message prevents presentation of the message to users other than the target user.

15. The computer program product of claim 14, wherein presenting the message to the target user via the client device responsive to determining the message was not previously presented to the target user comprises:
  withhold presentation of the message to the target user via the client device in response to determining the captured video data includes at least one user who is not an authorized user.

16. The computer program product of claim 10, wherein the computer readable storage medium further has instructions encoded thereon that, when executed by the processor, cause the processor to:
  store an indication the message was presented to the target user is association with the message responsive to presenting the message to the target user via the client device.

17. The computer program product of claim 16, wherein the computer readable storage medium further has instructions encoded thereon that, when executed by the processor, cause the processor to:
  transmit the indication in association with information identifying the target user to the online system for storage in association with the message and with the target user.

18. The computer program product of claim 10, wherein determine the user of the online system included in the captured video data is the target user comprises:
  determine a measure of similarity of information from the captured video data corresponding to the user to information identifying the target user; and
  determine the user of the online system included in the captured video data is the target user in response to the measure of similarity equaling or exceeding a threshold value.

* * * * *